(12) United States Patent
Jensen

(10) Patent No.: US 9,728,004 B2
(45) Date of Patent: Aug. 8, 2017

(54) IDENTIFYING A SELECTED FEATURE ON TESSELLATED GEOMETRY

(71) Applicant: The Boeing Company, Chicago, IL (US)

(72) Inventor: Max N. Jensen, Redmond, WA (US)

(73) Assignee: The Boeing Company, Chicago, IL (US)

( * ) Notice: Subject to any disclaimer, the term of this patent is extended or adjusted under 35 U.S.C. 154(b) by 122 days.

(21) Appl. No.: 14/733,206

(22) Filed: Jun. 8, 2015

(65) Prior Publication Data

US 2016/0358372 A1      Dec. 8, 2016

(51) Int. Cl.
*G06T 17/10*       (2006.01)
*G06T 17/20*       (2006.01)

(52) U.S. Cl.
CPC .............. *G06T 17/20* (2013.01); *G06T 17/10* (2013.01)

(58) Field of Classification Search
CPC ... G06T 7/0002; G06T 7/0004; G06T 7/0012; G06T 7/0042; G06T 19/20; G06T 2200/04; G06T 2200/08; G06T 2207/30004–2207/30101
See application file for complete search history.

(56) References Cited

U.S. PATENT DOCUMENTS

2013/0124149 A1* 5/2013 Carr ........................ G06F 17/50
703/1

2013/0212537 A1* 8/2013 Hall ........................ G06T 19/00
715/849

2014/0192050 A1    7/2014 Qiu et al.

OTHER PUBLICATIONS

Schnabel, Ruwen, Roland Wahl, and Reinhard Klein. "Efficient RANSAC for point—cloud shape detection." Computer graphics forum. vol. 26. No. 2. Blackwell Publishing Ltd, 2007, p. 214-226.*
Wikipedia, "Ray casting," downloaded from the Internet Apr. 10, 2015, 4 pages; <http://en.wikipedia.org/wiki/Ray_casting>.
Eberly, David, "Fitting 3D Data with a Cylinder," Geometric Tools, LLC, 2014, 14 pages.
Hartman, Nathan W., et al., "Examining Neutral Formats for Visualization and Data Exchange," PDES, Inc/NIST/Purdue University Collaboration Final Report, 69 pages.

* cited by examiner

*Primary Examiner* — Jacinta M Crawford
*Assistant Examiner* — Diane Wills
(74) *Attorney, Agent, or Firm* — Charles L. Moore; Moore & Van Allen PLLC

(57) ABSTRACT

A method for identifying and measuring a feature on tessellated geometry may include providing an image of a part on a display using an electronic representation of the part. The part may include a tessellated geometry. The electronic representation of the tessellated geometry of the part may include a collection of triangles defined by vertices of each triangle. The method may also include receiving selection of a feature on the tessellated geometry of the part. A first triangle of the collection of triangles that is associated with the selected feature is chosen and at least a first vertex and a second vertex of the first triangle are determined. A predefined normal to each of the vertices is also determined. The predefined normals from at least two of the vertices are used to identify and measure the feature of the part.

20 Claims, 5 Drawing Sheets

IDENTIFYING A SELECTED FEATURE ON TESSELLATED GEOMETRY

FIELD

The present disclosure relates to performing operations on a part, such as identifying features, measuring features, manufacturing, inspection, or other operation, and more particularly to a method, system and computer program product for identifying a selected feature on tessellated geometry in an electronic representation of the part.

BACKGROUND

Computer assisted design (CAD) applications are capable of defining topological features of parts or geometry via precise mathematical definition. However, CAD applications tend to be slow in loading because of the many features and are limited in the amount of geometry that can be loaded simultaneously. Because of these limitations to an original CAD file of a part, component or assembly, what are referred to as lightweight 3-dimensional (3D) graphics applications may be used for later or downstream applications after the original design of a part or assembly. Examples of later or downstream applications may include manufacturing and inspection of parts, 3D parts catalogs, design/manufacturing reviews and other applications. Lightweight 3D graphics applications use a tessellated format to represent certain features, such as cylinders, spheres or other features where the geometry of the part may be complex and include curved or angled features. Tessellated geometries may be stored in lightweight 3D graphics formats or other electronic representations as a collection of triangles defined by the end vertices of the respective triangles which may make identifying and measuring the specific features in the electronic representation with accuracy difficult. For example, if a hole through a planar surface is at an angle, the resulting intersection becomes an ellipse. In this case, a lightweight 3D graphics application or viewer may attempt to fit a circle to a few of the points found on an edge of the hole and report a radius that will be outside the necessary tolerance for later or downstream applications. Another example is a hole penetrating a cylindrical shaft or a complex compound curvature. A lightweight 3D graphics application may be unable to identify a circular edge or the fact that the part is a cylinder and the opening or hole through the shaft is cylindrically shaped.

SUMMARY

In accordance with an embodiment, a method for identifying and measuring a feature on tessellated geometry may include providing, by a processor, an image of a part on a display using an electronic representation of the part. The part includes a tessellated geometry and the tessellated geometry, in the electronic representation, includes a collection of triangles defined by the vertices of each triangle. The method may also include receiving, by the processor, selection of a feature of the part, the feature being on the tessellated geometry of the part. The method may additionally include choosing, by the processor, a first triangle of the collection of triangles of the tessellated geometry that is associated with the selected feature and determining, by the processor, at least a first vertex and a second vertex of the first triangle. The method may additionally include determining, by the processor, a predefined normal associated with at least each of the first vertex and the second vertex of the first triangle. The method may further include using, by the processor, the predefined normals from at least the first vertex and the second vertex to identify and measure the feature of the part. Using the predefined normals provides a faster mechanism to identify and measure the feature than using point fitting of the vertices alone to identify and measure the feature.

In accordance with another embodiment, a system for identifying and measuring a feature on tessellated geometry may include a processor and a display. The system may also include an application operating on the processor for identifying and measuring a feature on tessellated geometry. The application may be configured to perform a set of functions that may include providing an image of a part on the display using an electronic representation of the part. The part includes a tessellated geometry and the tessellated geometry, in the electronic representation, includes a collection of triangles defined by vertices of each triangle. The set of functions may also include receiving selection of a feature of the part that is on the tessellated geometry of the part. The set of functions may additionally include choosing a first triangle of the collection of triangles of the tessellated geometry that is associated with the selected feature and determining at least a first vertex and a second vertex of the first triangle. The set of functions may further include determining a predefined normal associated with at least each of the first vertex and the second vertex of the first triangle and using the predefined normals from at least the first vertex and the second vertex to identify and measure the feature of the part.

In accordance with a further embodiment, a computer program product for identifying and measuring a feature on tessellated geometry may include a computer readable storage medium having program instructions embodied therewith. The computer readable storage medium is not a transitory medium per se and the program instructions are executable by a device to cause the device to perform a method that may include providing an image of a part on a display using an electronic representation of the part. The part includes a tessellated geometry and the tessellated geometry, in the electronic representation, includes a collection of triangles defined by vertices of each triangle. The method may also include receiving selection of a feature of the part, the feature being on the tessellated geometry of the part. The method may additionally include choosing a first triangle of the collection of triangles of the tessellated geometry that is associated with the selected feature and determining at least a first vertex and a second vertex of the first triangle. The method may further include determining a predefined normal associated with at least each of the first vertex and the second vertex of the first triangle and using the predefined normals from at least the first vertex and the second vertex to identify and measure the feature of the part, wherein using the predefined normals provides a faster mechanism to identify and measure the feature than using point fitting of the vertices alone.

In accordance with an embodiment and any of the previous embodiments, using the predefined normals from at least the first vertex and the second vertex to identify and measure the feature of the part includes defining a first line corresponding to the first vertex and the predefined normal of the first vertex; defining a second line corresponding to the second vertex and the predefined normal of the second vertex; determining a third vertex of the first triangle and defining a third line corresponding to the third vertex and the predefined normal of the third vertex. The method may also include determining a center point of the feature corresponding to a location where the first line comes closest to the second line or the third line comes closest to the first line if the first line is parallel to the second line and measuring a distance from the center point to the first vertex. The distance corresponds to a measurement of the feature.

In accordance with an embodiment and any of the previous embodiments, the method may further include improving the accuracy of the measurement of the feature by performing a set of functions that may include selecting an adjacent vertex to a previously selected vertex and determining a predefined normal of the adjacent vertex. The set of functions may also include defining an associated line associated with the adjacent vertex and a predefined normal of the adjacent vertex. The set of functions may additionally include determining a closest point on the first line corresponding to the associated line and determining a distance between the closest point and the center point of the feature. The adjacent vertex is discarded in response to the closest point not being substantially equal to the center point within a preset limit of precision and the adjacent vertex is saved as part of the feature in response to the closest point being substantially equal to the center point within the preset limit of precision.

In accordance with an embodiment and any of the previous embodiments, the method may further include repeating the set of functions until a preset validation threshold is met. The method may also include saving a closest point for each performance of the set of functions in response to the closest point being substantially equal to the center point within the preset limit of precision and measuring a distance of each closest point to the first vertex. The measured distance providing the measurement of the feature. If the feature is a cylindrical opening, the measurement of the feature is a radius of the cylindrical opening. If the feature is spherical, the measurement of the feature is a center of the sphere.

BRIEF DESCRIPTION OF THE DRAWINGS

The following detailed description of embodiments refers to the accompanying drawings, which illustrate specific embodiments of the disclosure. Other embodiments having different structures and operations do not depart from the scope of the present disclosure.

DETAILED DESCRIPTION

Figure 1A:
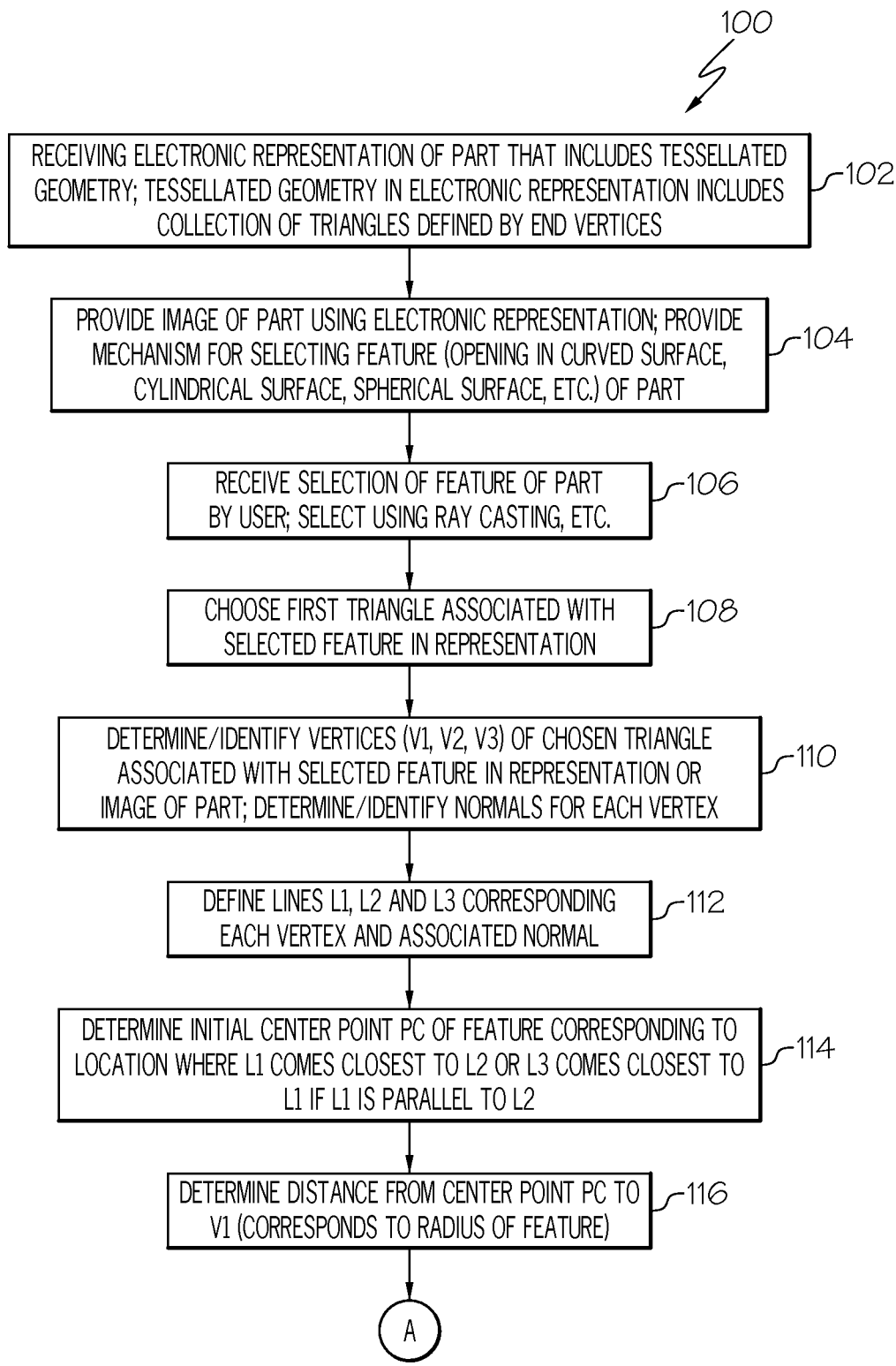
FIGS. 1A and 1B (collectively FIG. 1) are a flow chart of an example of a method for identifying and measuring a selected feature on tessellated geometry in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1B:
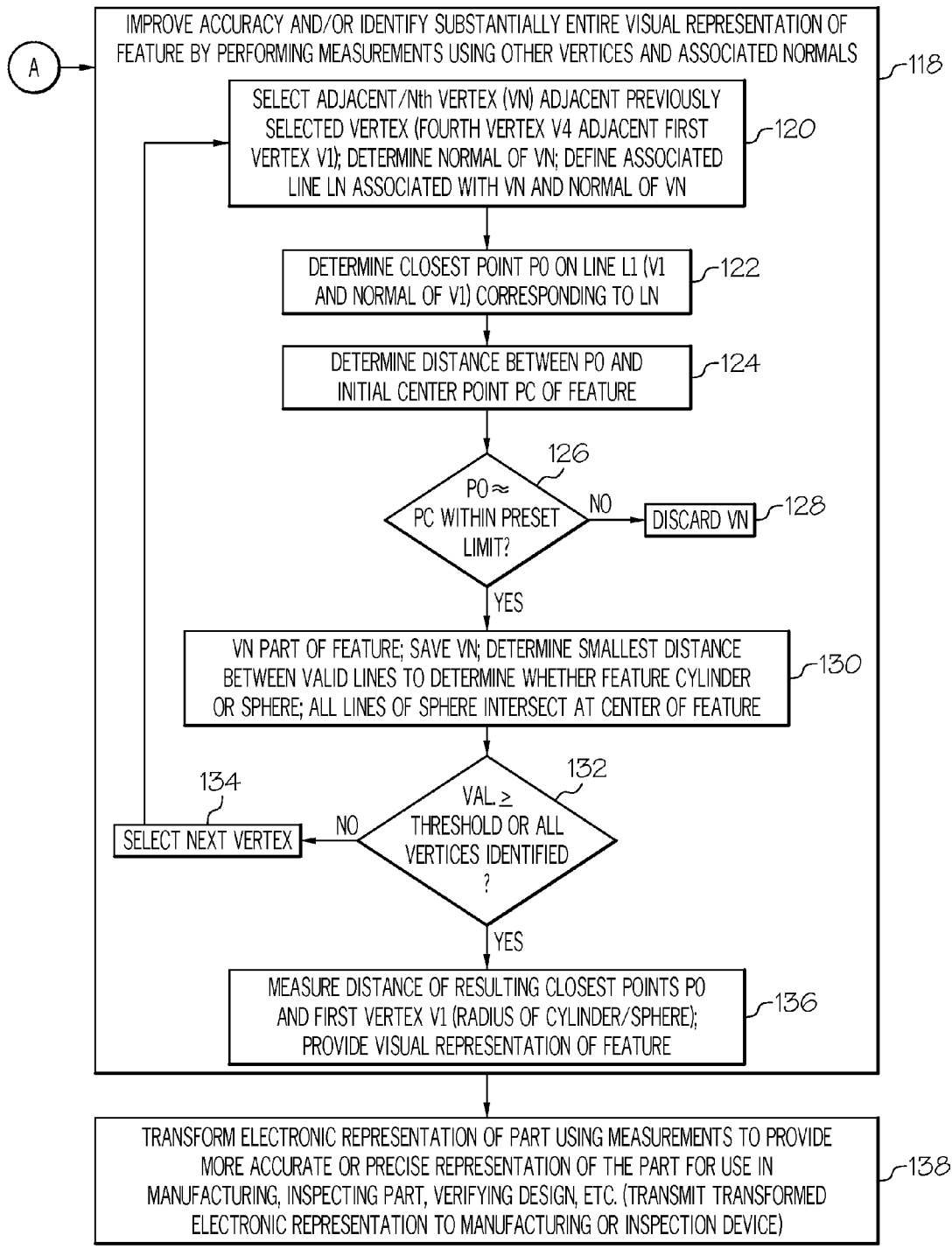

FIGS. 1A and 1B (collectively FIG. 1) are a flow chart of an example of a method 100 for identifying and measuring a selected feature on tessellated geometry in accordance with an embodiment of the present disclosure. In block 102, an electronic representation of the part that includes a tessellated geometry may be received by a system for identifying and measuring features on the tessellated geometry. A tessellated geometry may include but is not necessarily limited to a curved geometry, such as a cylinder or spherical shape or other curved shape, a non-planar geometry or any structure that has irregular surfaces. In the electronic representation of the part, the tessellated geometry may include a collection of triangles defined by vertices of each of the triangles. An example of a system for identifying and measuring features on tessellated geometry will be described in more detail with reference to FIG. 3. The method 100 may be embodied in the system and performed by the system. The system may include a processor for performing the functions and operations described herein. As described in more detail herein, the electronic representation of the part may be transformed by the method 100 to provide a more accurate or precise electronic representation of the part including more accurate measurement and identification information associated with a feature or features of the part for use in performing various operations or functions on the part as further described herein.

The electronic representation of the part may be a lightweight 3-dimensional (3D) graphics format or application. Examples of lightweight 3D graphics applications or formats may include but are not necessarily limited to 3DXML, JT and Universal 3D (U3D). 3DXML is a proprietary 3-D file format developed by Dassault Systemes. JT is a 3-D data format developed by Siemens PLM Software and U3D is a compressed file format standard for 3-D computer graphics defined by a special consortium called the 3D Industry Forum.

In block 104, an image of the part may be provided or presented on a display of the system using the electronic representation of the part. A mechanism may be provided for selecting a feature on the tessellated geometry of the part. An example of a mechanism for selecting the feature on the tessellated geometry may include but is not necessarily limited to a computer pointing device, such as a mouse or other arrangement as known in the computing arts that may be used for selecting a feature in an image on a display.

Figure 2A:
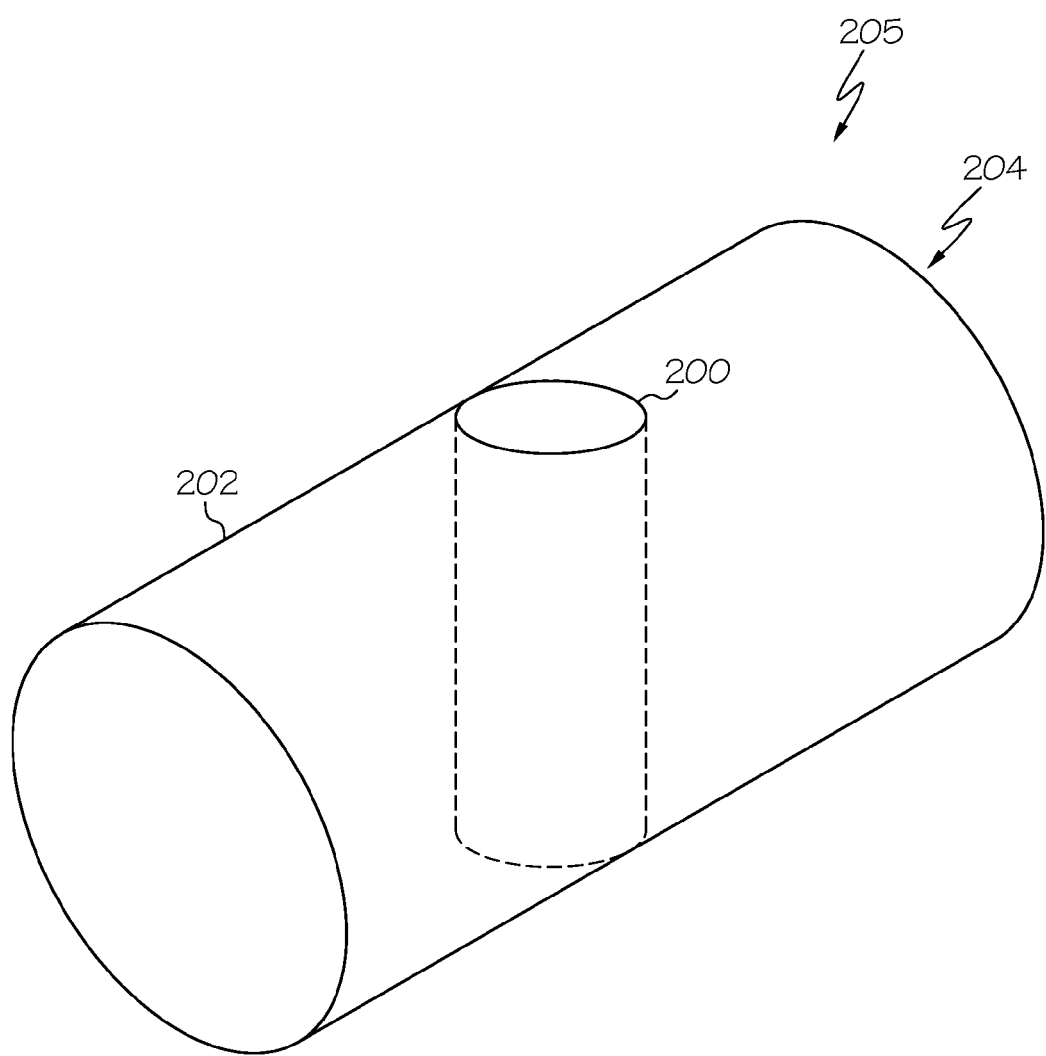
FIGS. 2A and 2B illustrate an example of identifying and measuring a feature on a part that includes a tessellated geometry in accordance with an embodiment.
Figure 2B:
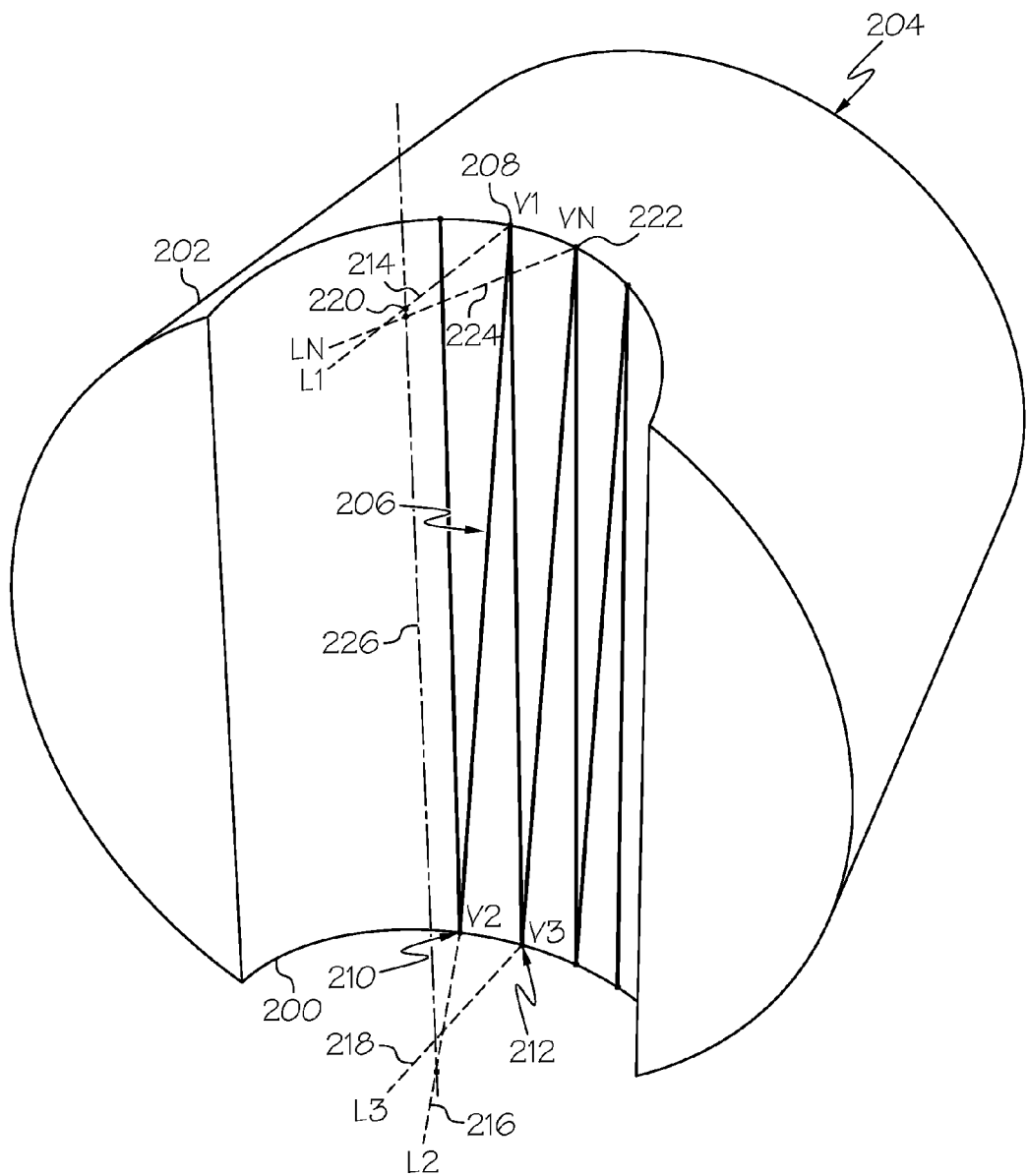

FIGS. 2A and 2B are also referred to during the description of the exemplary method 100 for purposes of providing an example of the operation of the method 100. FIGS. 2A and 2B illustrate an example of identifying and measuring a feature 200 on a part 202 that includes a tessellated geometry 204 in accordance with an embodiment. In the example of FIG. 2A, the tessellated geometry 204 includes a cylindrically shaped shaft and the feature 200 is an opening or cylindrically shaped opening or hole into or through the part 202. As previously discussed the tessellated geometry 204 of the cylindrically shaped shaft and feature 200 or cylindrically shaped opening may be represented in the electronic representation of the part 202 by a collection of triangles defined by their respective end vertices. While the method 100 will be described with reference to the exemplary part 202 and tessellated geometry 204 in FIGS. 2A and 2B, the operations and functions described could be equally applied to any part with any type of tessellated geometry and any selected feature on or in the tessellated geometry. In the example of FIG. 2A, the feature 200 may be selected by a user in a curved surface or cylindrical surface of the part 202.

In block 106, the selection of the feature 200 on the tessellated geometry 204 of the part 202 by the user may be received by the system. Selecting the feature 200 may use ray casting or other technique to select the feature 200 from an image 205 of the part 202 being presented on a display. Referring also to FIG. 2B, FIG. 2B is an example of selecting the feature 200 using ray casting. FIG. 2B is a perspective view of a cross-section of the part 202 or cylindrical shaft midway through the feature 200 or cylindrical opening to facilitate explanation of the exemplary method 100.

In block 108, a first triangle 206 (FIG. 2B) associated with the selected feature 200 in the representation or image 205 of the part 202 may be chosen. In block 110, the vertices (first vertex V1 208, second vertex V2 210 and third vertex V3 212) of the chosen first triangle 206 associated with the selected feature 200 may be determined or identified. A normal 214, 216 and 218 associated with each of the vertices 208, 210 and 212 may also be determined. A normal associated with each of the vertices of the collection of triangles are used in lightweight 3D graphics formats and are predefined to provide proper lighting or shading when rendering a 3D image in a two-dimensional (2D) format. Accordingly, the predefined normal associated with each of the vertices of the collection of triangles will be included in the electronic representation of the part that is received by the system. As described in more detail herein, the predefined normals are repurposed in a sense to provide a more accurate measurement and identification of the feature 200 on the tessellated geometry 204 than can be obtained or measured directly from the image rendered by the electronic representation or lightweight 3D graphics format or by using point fitting of the vertices to identify and measure a feature of a part. The predefined normals also provide a faster mechanism that uses less computer capacity to identify and measure a selected feature of a part than using point fitting of the vertices alone to identify and measure the feature. Point fitting the vertices requires the use of more computations, more computer capacity and longer time compared to also using the predefined normal associated each of the vertices.

In block 112, a line (L1, L2 and L3) corresponding to each vertex 208, 210, and 212, respectively, and the associated normal 214, 216 and 218 may be defined or determined. The lines L1, L2 and L3 respectively correspond to the associated normals 214, 216 and 218 in the example of FIG. 2B. The lines L1, L2 and L3 and associated normals of the respective vertices 208, 210 and 212 are represented by the broken lines 214, 216 and 218 in example in FIG. 2B.

In block 114, an initial center point PC 220 of the feature 200 may be determined. The center point PC corresponds to a location where line L1 214 comes closest to line L2 216, or a location where line L3 218 comes closest to line L1 214 if line L1 214 is parallel to line L2 216. The center point PC 220 corresponds to the point on the normal 214 of the first vertex 208 that is determined as the closest point to all normals of the vertices that are on the feature 200 or cylindrical opening.

In block 116, a distance from the center point PC 220 to the first vertex V1 208 is determined or measured. This distance corresponds to a measurement of the feature 200 or measurement of the radius of the cylindrical opening in the part 202 on the tessellated geometry 204 of the example in FIG. 2B.

In block 118, accuracy of the measurement of the feature 200 may be improved over that found using the vertices and normals of the first triangle 206 by performing measurements using other vertices and associated normal. Substantially an entire visualization of the feature 200 may be identified with improved accuracy using a significant number of the other vertices or substantially all of the vertices representing the feature 200 in the electronic representation of the part 202. Blocks 120-136 represent an example of a set of functions that may be performed in improving the accuracy of measuring or identifying the feature 200 or measuring and identifying the radius of the cylindrical opening and/or identifying or generating an entire visual representation of the feature 200.

In block 120, an adjacent vertex or Nth vertex (VN) adjacent to a previously selected vertex may be selected. For example, initially, an adjacent vertex 222 or fourth vertex (FIG. 2B) adjacent the first vertex 208 may be selected. A normal of the adjacent vertex (VN) 222 may be determined and an associated line (LN) 224 associated with the adjacent vertex (VN) 222 and the normal of the adjacent vertex (VN) 222 may be determined or defined. The associated line (LN) 224 corresponds with the normal of the adjacent vertex (VN) 222 in the example of FIG. 2B.

In block 122, a closest point P0 on the first line L1 214 corresponding to the associated line LN 224 may be determined or where the associated line LN 214 intersects the first line L1 214. The associated line LN 214 may intersect an axis or centerline 226 of the cylindrical opening 200 at the closest point P0 where the associated line LN 214 comes closest or intersects the first line L1 214.

In block 124, a distance between P0 and the initial center point PC 220 of the feature 200 or cylindrical opening may be determined. In block 126, a determination may be made whether P0 is approximately equal to PC 220 within a preset limit of precision. If P0 does not approximately equal PC 220 within the preset limit of precision, the method 100 may advance to block 128 and the adjacent vertex VN 222 may be discarded. If P0 is approximately equal to PC 220 within the preset limit of precision, the method 100 may advance to block 130. In block 130, the adjacent vertex VN 222 may be determined to be part of the feature 200 or cylindrical opening of the part 202 and the adjacent vertex VN 222 may be saved as part of the feature 200 or cylindrical opening for use in accurately determining or measuring the feature 200 or radius of the cylindrical opening and identifying the feature 200 as a cylindrical opening in the tessellated geometry 204.

The preset limit of precision may be set by the user and the distance between P0 and the center point PC 220 may be compared to the preset limit of precision. The preset limit of precision may be set according to allowable tolerances for the part 202. The limit of precision may be determined or preset by the number of decimal places that the system may be keeping track of. The precision may also be defined by the precision of the CAD model that was defined to use and the precision specified for converting to the tessellated geometry. Current CAD systems use at least double precision. The higher the precision or more decimal places used, the more accurate the measurement of the feature. 200.

In block 132, a determination may be made whether a sufficient number of valid vertices have been determined to provide a level or degree of validity or validation of the accuracy of the measurement of the feature 200 or cylindrical opening in the example of FIG. 2B. Valid vertices may be those vertices determined to be part of the selected feature 200 or cylindrical opening in the example of FIG. 2B and that may be saved to provide a collection of point for accurately identifying and measuring the selected feature 200 and rendering an accurate image of the selected feature 200. In block 132, a determination may be made if the validity of measurement or validation equals or exceeds a predetermined threshold or whether all or a predetermined number of valid vertices have been identified or determined. If a sufficient number of valid vertices to provide a desired level of validity and accuracy greater than the predetermined threshold have not been identified, the method 100 may advance to block 134 and a next vertex or next adjacent vertex to a previously selected vertex may be selected and the method may return to block 120. The method 100 may then proceed similar to that previously described. The set of functions in blocks 120-134 may be repeated until the preset validation threshold may be met. A closest point P0 for each performance of the set functions in blocks 120-134 may be saved in response to the closest point being substantially equal the center point PC 220 of the feature 200 or cylindrical opening within the preset limit of precision.

Even with the limitation of precision, the initial calculated radius may be improved by finding the closest point (radius of cylinder) of normals that are roughly 90 degrees in angle with respect to each other which are less susceptible to small changes in precision than those normals that are 1 degree apart. Gathering a number of closest points and finding an average point would also be more accurate. Accordingly an average of all the closest points for normals that have large angles relative to one another may be determined and those normals with small angles may be ignored.

If a sufficient number of valid vertices have been determined or the validation equals or exceeds the preset validation threshold in block 132, the method 100 may advance to block 136. In block 136, the distance of each closet point P0 to the first vertex V1 208 may be measured or determined. The measured distance provides the measurement of the feature 200 or in the example of FIG. 2A the radius of the cylindrical opening.

In another embodiment, the set of functions in blocks 120-134 may be repeated until all or a predetermined number of valid vertices have been determined. If all or the predetermined number of valid vertices have been determined in block 132, the method 100 may advance to block 136. The saved valid vertices may provide a substantially complete or entire visual representation of the feature 200 on the tessellated geometry 204 on a display.

In block 138, the electronic representation of the part 202 received in block 102 may be transformed using the resulting identification and measurements information of the selected feature 200 of the part 202 on the tessellated geometry 204 to provide a more accurate or precise representation of the part 202 from the method 100. The transformed representation including the resulting identification and measurement information may be used for performing various operations or functions relative to the part 202. Examples of the various operations or functions may include but are not necessarily limited to manufacturing the part 202, inspecting the part 202, verifying a design of the part 202, etc. The transformed representation of the part including the measurement or measurements and identification information may be transmitted to a manufacturing device, inspection device or other device for performing operations on the part 202 using the transformed, more accurate representation of the part 202 and feature 200.

Figure 3:
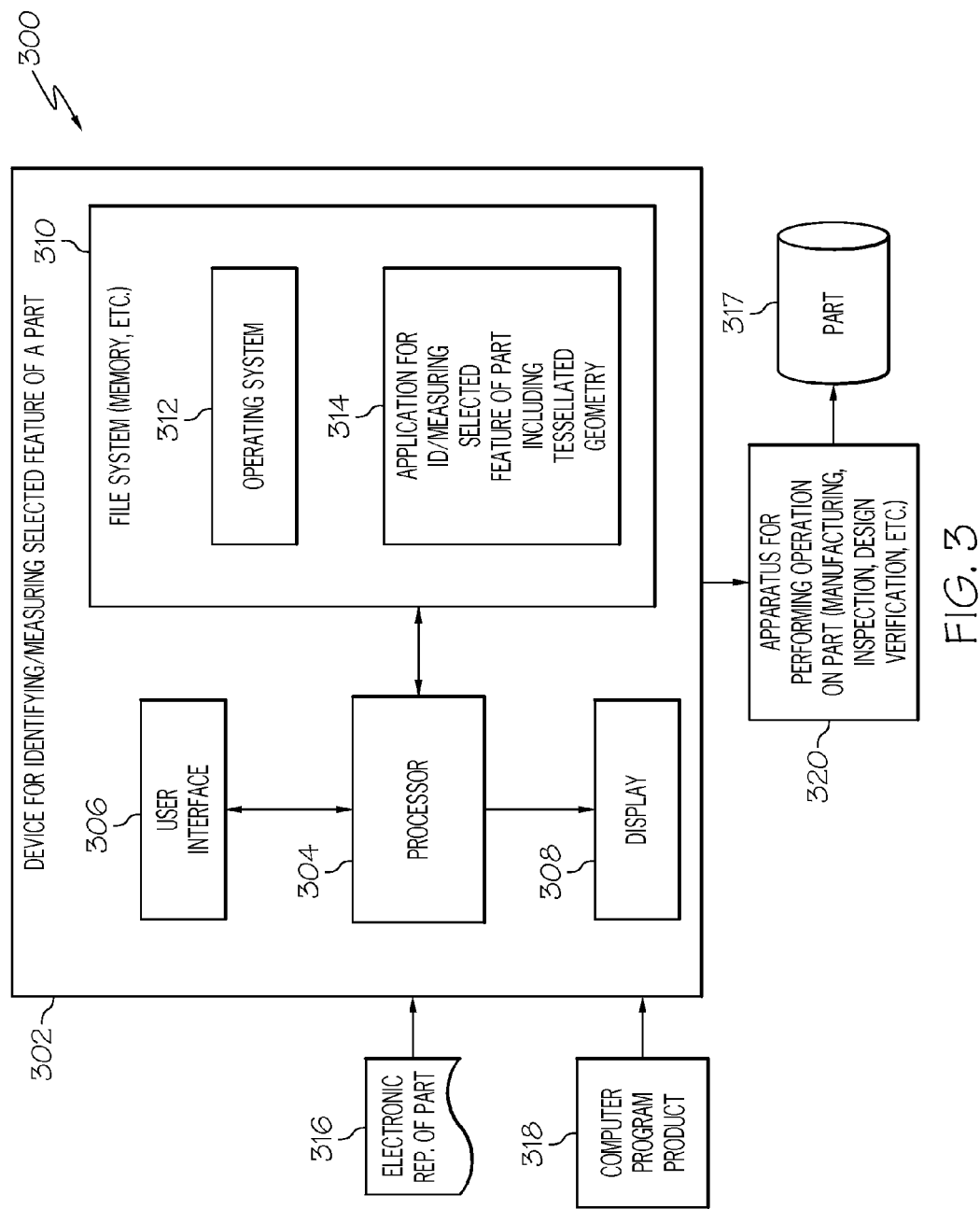
FIG. 3 is a block schematic diagram of an example of a system for identifying and measuring a selected feature on a part that includes a tessellated geometry in accordance with an embodiment of the present disclosure.

FIG. 3 is a block schematic diagram of an example of a system 300 for identifying and measuring a selected feature on a part that includes a tessellated geometry in accordance with an embodiment of the present disclosure. The system 300 may include a device 302 for identifying and measuring a selected feature on a part that may include a tessellated geometry. The method 100 may be embodied in and performed by the device 302. The device 302 may include a processor 304 for controlling operation of the device 302 and for performing operations and functions similar to those described with respect to the method 100 in FIGS. 1A and 1B. The device 302 may also include a user interface 306 and a display 308. The user interface 306 may include a keyboard or keypad, computer pointing device or any other mechanism to aid a user in operating the device 302 for identifying and measuring a selected feature of a part. The display 308 may be used to present an image of a part and to allow the user to select a feature of the part for identifying and measuring the feature of the part similar to that described herein.

The device 302 may also include a file system 310 or memory. An operating system 312, applications and other programs may be stored on the file system 310 for running or operating on the processor 304. An application 314 for identifying and measuring a selected feature of a part that includes a tessellated geometry may also be stored on the file system 310. The method 100 of FIGS. 1A-1B may be embodied in the application 314 and performed by the processor 304 when the application 314 is compiled and run on the processor 304.

The device 302 may receive an electronic representation 316 of a part, such as part 317. The electronic representation 316 of the part may be in a lightweight (3D) graphics format or application similar to that previously described. The application 314 may use the electronic representation 316 of the part to identify and measure selected features of the part 317 on the tessellated geometry of the part 317.

The application 314 may be loaded on the device 302 from a computer program product 318. The computer program product 318 may be similar to that previously described.

The system 300 may also include an apparatus 320 for performing operations on the part 317. Examples of the operations may include but are not necessarily limited to manufacturing the part 317, inspecting the part 317, design verification of the part 317 and any other operations related to the part 317. Identification information and measurement information determined or transformed by the application 314 from the electronic representation 316 of the part may be transmitted to the apparatus 320 for performing the particular operation on the part 317 with more accuracy or precision than using the electronic representation 316 of the part. Accordingly, the application 314 performing the method 100 may transform the electronic representation 316 of the part 317 and provide a more accurate representation of the part for use by the apparatus 320 in performing operations or functions on the part 317.

Accordingly, the system 300 may present the electronic representation of a part or assembly to provide information to assemble, fabricate, or inspect the part or assembly based on the representation of the part or assembly. In the past an electronic representation would explicitly provide the textual representation of all dimensions needed for performing such operations. Currently there standard methods that provide a 3D representation without actual textual representation of dimensions. This requires the person who needs the dimensional information to "interrogate" the electronic representation for needed dimensional information. The system 300 enables the user to do this with light weight graphic tessellated geometry for situations where this was not possible before. A shop floor mechanic may use the system 300 to interrogate data in the electronic representation to determine features, such as hole size to drill or how far apart holes need to be drill from each other. The system 300 may also provide inspectors the tool to validate that the feature or holes drilled were done according the interrogated dimensions from the tessellated geometry.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for identifying and measuring a feature on tessellated geometry, comprising:
   providing, by a processor, an image of a part on a display using an electronic representation of the part, the part comprising a tessellated geometry and the tessellated geometry, in the electronic representation, comprising a collection of triangles defined by vertices of each triangle;
   receiving, by the processor, selection of a feature of the part, the feature being on the tessellated geometry of the part;
   choosing, by the processor, a first triangle of the collection of triangles of the tessellated geometry that is associated with the selected feature;
   determining, by the processor, at least a first vertex and a second vertex of the first triangle;
   determining, by the processor, a predefined normal to at least each of the first vertex and the second vertex of the first triangle;
   using, by the processor, the predefined normals from at least the first vertex and the second vertex to identify and measure the feature of the part, wherein using the predefined normals provides a faster mechanism to identify and measure the feature than using point fitting of the vertices alone to identify and measure the feature and wherein the tessellated geometry comprises a curved surface, the method further comprising:
   using the first vertex and its predefined normal to define a first line;
   using the second vertex and its predefined normal to define a second line;
   determining a third vertex of the first triangle;
   using the third vertex of the first triangle and its predefined normal to define a third line; and
   determining a dimension of the feature based on a point on the first line that comes closest to the second line or the third line.

2. The method of claim 1, further comprising:
   selecting at least one other vertex of at least one other triangle of the collection of triangles;
   determining an associated normal of the at least one other vertex; and
   using the at least one other vertex and the associated normal of the at least one other vertex to improve the accuracy of the measurement of the feature.

3. The method of claim 1, further comprising:
   identifying all vertices of all triangles associated with the feature;
   determining associated normals for each of the vertices; and
   using all of the vertices and their associated normal to provide an entire visual representation of the feature on the display.

4. The method of claim 1, further comprising:
   determining a center point of the feature corresponding to a location where the first line comes closest to the second line, or the third line comes closest to the first line if the first line is parallel to the second line; and
   measuring a distance from the center point to the first vertex, the distance corresponding to a measurement of the feature.

5. The method of claim 4, wherein the selected feature comprises an opening through the curved surface, wherein measuring the distance from the center point to the first vertex comprises measuring a radius of the opening, and the method further comprises identifying the feature as a cylindrical opening through the part.

6. The method of claim 4, further comprising:
   selecting a fourth vertex, the fourth vertex being adjacent to the first vertex;
   determining a predefined normal of the fourth vertex;
   defining a fourth line corresponding to the fourth vertex and the predefined normal of the fourth vertex;
   determining a closest point on the first line represented by the fourth line;
   determining a distance between the closest point and the center point of the feature;
   discarding the fourth vertex in response to the closest point not being substantially equal to the center point within a preset limit of precision; and
   saving the fourth vertex as part of the feature in response to the closest point being substantially equal to the center point within the preset limit of precision.

7. The method of claim 4, further comprising improving accuracy of the measurement of the feature by performing a set of functions comprising:
   selecting an adjacent vertex to a previously selected vertex;
   determining a predefined normal of the adjacent vertex;
   defining an associated line associated with the adjacent vertex and the predefined normal of the adjacent vertex;
   determining a closest point on the first line corresponding to the associated line;
   determining a distance between the closest point and the center point of the feature;
   discarding the adjacent vertex in response to the closest point not being substantially equal to the center point within a preset limit of precision; and saving the adjacent vertex as part of the feature in response to the closest point being substantially equal to the center point within the preset limit of precision.

8. The method of claim 7, further comprising:
repeating the set of functions until a preset validation threshold is met;
saving a closest point for each performance of the set of functions in response to the closest point being substantially equal to the center point within the preset limit of precision; and
measuring a distance of each closest point to the first vertex, the measured distance providing the measurement of the feature.

9. The method of claim 7, further comprising repeating the set of functions for a predetermined number of vertices to provide an entire visual representation of the feature on the display.

10. The method of claim 9, wherein the selected feature comprises an opening through the curved surface and the part, the method further comprising:
determining a radius of the opening by measuring a distance of each closest point to the first vertex in response to the closest point being substantially equal to the center point within the preset limit of precision; and
identifying the selected feature as a cylindrical opening through the part.

11. The method of claim 1, further comprising one of manufacturing, inspecting or verifying a design of the part using the measurement.

12. The method of claim 1, wherein the predefined normal of each vertex is predefined to provide proper lighting and shading when rendering a three-dimensional (3D) image in a two-dimensional (2D) format, the method further comprising repurposing the predefined normals for use in measuring the feature.

13. A system for identifying and measuring a feature on tessellated geometry, comprising:
a processor;
a display;
an application operating on the processor for identifying and measuring a feature on tessellated geometry, the application being configured to perform a set of functions comprising:
providing an image of a part on the display using an electronic representation of the part, the part comprising a tessellated geometry and the tessellated geometry, in the electronic representation, comprising a collection of triangles defined by vertices of each triangle;
receiving selection of a feature of the part, the feature being on the tessellated geometry of the part;
choosing a first triangle of the collection of triangles of the tessellated geometry that is associated with the selected feature;
determining at least a first vertex and a second vertex of the first triangle;
determining a predefined normal to at least each of the first vertex and the second vertex of the first triangle;
using the predefined normals from at least the first vertex and the second vertex to identify and measure the feature of the part, wherein using the normals provides a faster mechanism to identify and measure the feature than using point fitting of the vertices alone to identify and measure the feature and wherein the tessellated geometry comprises a curved surface, the method further comprising:

using the first vertex and its predefined normal to define a first line;
using the second vertex and its predefined normal to define a second line;
determining a third vertex of the first triangle;
using the third vertex of the first triangle and its predefined normal to define a third line; and
determining a dimension of the feature based on a point on the first line that comes closest to the second line or the third line.

14. The system of claim 13, wherein the selected feature comprises an opening through the curved surface, the set of functions further comprising:
determining a radius of the opening based on a point on the first line that comes closest to the second line or the third line; and
identifying the feature as a cylindrical opening through the part.

15. The system of claim 13, wherein using the predefined normals from at least the first vertex and the second vertex to identify and measure the feature of the part comprises:
determining a center point of the feature corresponding to a location where the first line comes closest to the second line, or the third line comes closest to the first line if the first line is parallel to the second line; and
measuring a distance from the center point to the first vertex, the distance corresponding to a measurement of the feature.

16. The system of claim 15, further comprising improving accuracy of the measurement of the feature by performing a group of functions comprising:
selecting an adjacent vertex to a previously selected vertex;
determining a predefined normal of the adjacent vertex;
defining an associated line associated with the adjacent vertex and a predefined normal of the adjacent vertex;
determining a closest point on the first line corresponding to the associated line;
determining a distance between the closest point and the center point of the feature;
discarding the adjacent vertex in response to the closest point not being substantially equal to the center point within a preset limit of precision; and
saving the adjacent vertex as part of the feature in response to the closest point being substantially equal to the center point within the preset limit of precision.

17. The system of claim 16, the group of functions further comprising:
repeating the set of functions until a preset validation threshold is met;
saving a closest point for each performance of the set of functions in response to the closest point being substantially equal to the center point within the preset limit of precision; and
measuring a distance of each closest point to the first vertex, the measured distance providing the measurement of the feature.

18. A computer program product for identifying and measuring a feature on tessellated geometry, the computer program product comprising a computer readable storage medium having program instructions embodied therewith, wherein the computer readable storage medium is not a transitory medium per se, the program instructions being executable by a device to cause the device to perform a method comprising:
providing an image of a part on a display using an electronic representation of the part, the part comprising a tessellated geometry and the tessellated geometry, in the electronic representation, comprising a collection of triangles defined by vertices of each triangle;

receiving selection of a feature of the part, the feature being on the tessellated geometry of the part;

choosing a first triangle of the collection of triangles of the tessellated geometry that is associated with the selected feature;

determining at least a first vertex and a second vertex of the first triangle;

determining a predefined normal to at least each of the first vertex and the second vertex of the first triangle;

using the predefined normals from at least the first vertex and the second vertex to identify and measure the feature of the part, wherein using the predefined normals provides a faster mechanism to identify and measure the feature than using point fitting of the vertices alone to identify and measure the feature and wherein the tessellated geometry comprises a curved surface, the method further comprising:

using the first vertex and its predefined normal to define a first line;

using the second vertex and its predefined normal to define a second line;

determining a third vertex of the first triangle;

using the third vertex of the first triangle and its predefined normal to define a third line; and determining a dimension of the feature based on a point on the first line that comes closest to the second line or the third line.

19. The computer program product of claim 18, wherein the method further comprises:

selecting at least one other vertex of at least one other triangle of the collection of triangles;

determining an associated normal of the at least one other vertex; and using the at least one other vertex and the associated normal of the at least one other vertex to improve the accuracy of the measurement of the feature.

20. The computer program product of claim 18, wherein using the predefined normal from at least two of the vertices to identify and measure the feature of the part comprises:

determining a center point of the feature corresponding to a location where the first line comes closest to the second line, or the third line comes closest to the first line if the first line is parallel to the second line; and measuring a distance from the center point to the first vertex, the distance corresponding to a measurement of the feature.

* * * * *